April 8, 1952     W. E. TRUMPLER     2,592,082
FLOATING SHAFT SEAL
Filed Nov. 6, 1948
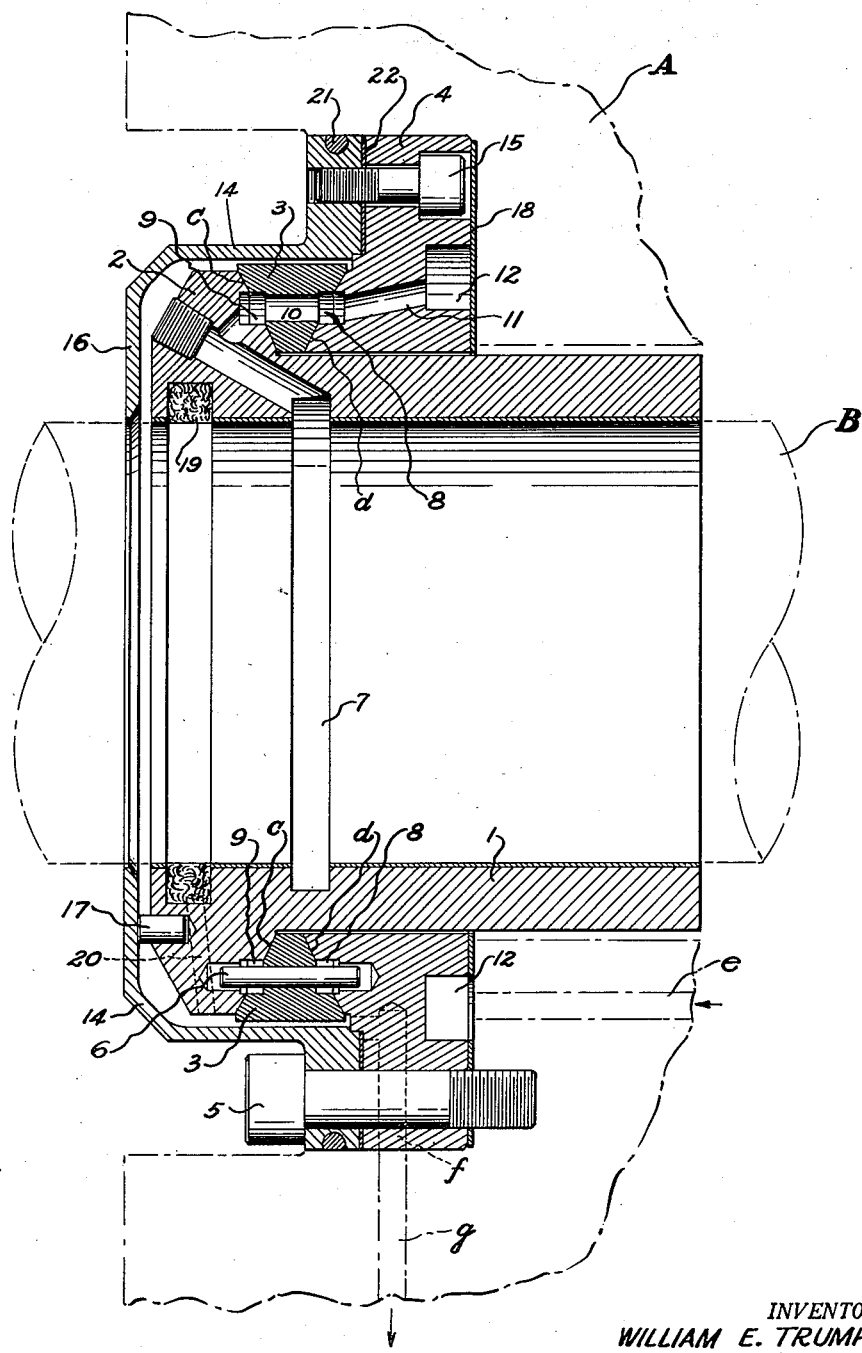
INVENTOR.
WILLIAM E. TRUMPLER
BY Patented Apr. 8, 1952

2,592,082

UNITED STATES PATENT OFFICE 2,592,082

FLOATING SHAFT SEAL

William E. Trumpler, Olean, N. Y., assignor to Clark Bros. Co., Inc., Olean, N. Y., a corporation of New York Application November 6, 1948, Serial No. 58,665

5 Claims. (Cl. 286—15)

This invention relates to sealing means applicable to a high-speed rotating shaft to be effective at a wall through which such shaft extends. A common example of a machine of the class to which such sealing means is particularly adapted, is a high-speed, high-pressure centrifugal compressor, the rotor shaft of which extends through the wall of the rotor casing.

Briefly, with sealing objective, the invention contemplates a sleeve fitting much more closely upon the shaft than the fit of the shaft in its bearings, a floating mounting of the sleeve in the wall which will permit both angular and translatory self-adjustment of the sleeve relative to the wall together with sealing between sleeve and wall, and provision of sealing fluid flow by way of the sleeve along the shaft in both directions from a location intermediate the sleeve ends.

Another object is to provide an assembly of the sealing parts, permitting handling and mounting thereof as a unit, preventing damage thereto by careless handling, and maintaining their cooperative bearing surfaces against entry of dirt.

Other objects are to provide a seal operable at far higher rotational speed than the usual axial contact seal, with minimum frictional loss, and yet capable of production without requiring mirror finish surfaces.

Further objects and advantages will be apparent from the following description taken in connection with the accompanying drawing which shows an embodiment of the invention, and indicates in broken lines immediately adjacent portions of the wall and shaft between which the embodiment is effective.

With reference now to the drawings, A indicates the wall and B the shaft of a high-speed centrifugal machine such as a compressor. As will be well understood by one familiar with the art, the shaft B is mounted in bearings not herein illustrated, which bearings support the shaft for high-speed rotation, and which shaft extends through an opening provided for the purpose in the wall A. Further, it will be understood that the wall A may be a portion of a casing which may house an impeller mounted on the shaft and that suitable means for driving the shaft in its bearings may be provided outside of such casing. Thus, such impeller would be maintained on the shaft at the left, inside the casing, such shaft driving means would be disposed at the right, outside the casing, with reference to the drawing. Moreover, it is to be understood that the arrangement is such that pressure within the casing at the left of the wall A may be very substantial, and at any rate is greater than pressure outside the casing at the right of the wall A which may be atmospheric pressure.

According to my invention I provide a sleeve 1 fitting very closely upon the shaft B with a cylindrical portion extending through the shaft opening in the wall A and having an annular head or flange 2 located on the high-pressure side of the wall. Preferably, the sleeve is of a material having a greater heat expansion rate than that of the shaft, so that its clearance therefrom will automatically increase with rising temperature, and, therefore, similarly increase the flow of sealing fluid and corresponding cooling effect thereof, as will hereinafter appear.

The sleeve may be lined with babbitt or the like as indicated in the drawing, and its fit on the shaft may be very small relative to the fit of the shaft in the bearings in which the shaft is mounted. In practice, on a shaft of 3 inches in diameter, the sleeve clearance may be held to the order of .002 of an inch on the diameter as compared with .006 to .008 at the bearings of the shaft.

Further, according to the invention, I provide a ring or lens 3 effective between the head 2 of the sleeve and the wall A so that the ring will be caused to have endwise bearing between these parts, by fluid pressure at the high pressure side of the wall. As here shown, a face plate or base 4 is mounted in the wall as by bolts 5 to provide a finished bearing face for the ring 3, the face plate 4 extends about the sleeve 1 with some annular clearance therefrom as indicated in the drawing.

The arrangement is such that there are bearing surfaces endwise of the shaft B at the faces of the ring 3 and including the face of the head 2 at the high pressure end of the ring as indicated at c and the face of the plate 4 at the opposite end of the ring as indicated at d.

According to this invention at least one cooperating pair of such endwise bearing surfaces of the parts, as at c and d, are spherical; and if both pairs are spherical as shown in the drawings, those at one face of the ring are non-concentric with those of the opposite face.

In the example illustrated, these faces at c and d are of opposite curvature at the opposite end of the ring, concave with respect to the ring, and each is concentric with a remote point on the general center line of the parts.

The arrangement permits the sleeve to have both angular and limited translatory adjustment relative to the wall A, with the shaft, the ring 3 floating between the sleeve including its head 2 and the wall A including the plate 4 to permit such sleeve adjustment yet always maintaining sealing effectiveness at the endwise bearing faces c and d.

For securement of both the sleeve 1 and the ring 3 against rotation with the shaft B, while permitting them limited motion relative to the wall A so that the sleeve may accommodate itself to the shaft, one or more pins 6 are provided, each mounted in the ring 3 and having ends extending therebeyond and into recesses loosely receiving them in the head 2 of the sleeve and the plate 4 respectively, as indicated at the lower part of the drawing.

The sleeve is provided with an internal annular recess 7 intermediate its ends, to which sealing fluid is forced under sufficient pressure to insure slight flow thereof from the recess 7 along the shaft toward the high pressure side of the wall A.

Preferably, the fluid is led to the recess 7 by way of passages which provide seal and fluid lubrication for the endwise bearings of the ring 3 as well as cooling of the associated parts. For the purpose and as here shown, a pair of equalizing recesses or passages 8 and 9 are provided at the opposite faces of the ring, each annular with the ring, of greater size than the pins 6, and each including an annular cavity in the ring matched by a cooperative annular cavity in the corresponding part against which the ring has endwise bearing. These annular cavities at the bearing faces c and d, and which form the equalizing passages 8 and 9, are preferably of rectangular outline in transverse section as illustrated, so that they provide flat annular faces in the parts in which they are disposed; an advantage of such arrangement being to facilitate drilling in the parts commencing at such faces.

Particularly as shown in the upper portion of the drawing, the two annular equalizing cavities 8 and 9 are interconnected by one or more passageway openings 10 extending longitudinally through the ring 3. For sealing fluid supply to the passage 8, the face plate 4 is drilled as indicated at 11 and provided with an annular recess 12 and the wall A provided with a passage leading to the recess, as conventionally indicated at e and for flow from the passage 9 to the recess 7, the head 2 of the sleeve 1 at one or more locations is drilled and plugged as indicated in the upper portion of the drawing.

It will be apparent that by the arrangement described, fluid pressure at both faces c and d of the ring 3, will be substantially equalized, particularly thereabout by the passages within the cavities 8 and 9 and therebetween by the passageways 10.

Since some leakage must be permitted from the recess 7 toward the high-pressure side of the wall, a felt ring 19 recessed in the head portion 2 of the sleeve is provided to collect such leakage and drain it through capillary hole 20 into the hollow of the retainer cup 14, from which it is drained by passages f and g provided respectively in the plate 4 and wall A, and returned to the seal fluid reservoir. Arrows in the drawing indicate direction of flow of sealing fluid, it being understood that in operation such fluid is supplied at a pressure slightly above that on the high-pressure or impeller side of the wall, to avoid leakage across the seal. Oil may be employed as sealing fluid, but it will be noted that the seal operates on hydrodynamic principle, very little lubricating quality being required of the sealing fluid.

A retainer cup member 14, secured to the plate 4 as by a number of circumferentially spaced bolts 15, is provided to surround and protect the sealing parts and particularly the ring 3 and bearing surfaces thereof, and having overhanging relation with the head portion 2 of the sleeve to maintain the assembly of seal parts of which the principal ones are the sleeve 1, plate 4, and ring 3.

More particularly for the purpose, and in order to maintain bearing at the faces of the ring 3 and thereby prevent entrance of foreign matter at such faces in handling, the retainer 14 includes an internal flange or lip 16 disposed adjacent the head end of the sleeve, and the latter is provided with two or more spacer pins or dowels 17. Such pins are arranged with a light bearing fit against the flange 16 overhanging the head end of the sleeve and the flange is sufficiently thin to have slight resilience, so that, while motion is permitted, there is no looseness between the parts particularly at the faces of the ring 3, thus yieldably maintained in bearing relation with their cooperative part. Thus, all of the seal parts may be preassembled and handled as a unit. Such unit is mounted in the wall A by the bolts 5 which will be understood as located in alternating relation with the bolts 15, a gasket 18 being preferably located between faces of the plate 4 and wall A, provided with an opening admitting communication between the recess 12 and passage e. A peripheral sealing ring 21 may be provided in the retainer cup 14, and gasket 22 disposed between the retainer cup and the plate 4 as indicated in the drawing.

The sleeve 1 being of material of greater heat expansion than that of the shaft B, clearance therebetween in operation will be caused to increase with temperature rise, with consequent increase in flow of sealing fluid, and corresponding increase in cooling effect therefrom.

Notable advantages of the invention of this application are minimum frictional loss, omission of necessity for mirror finish surfaces, and capability of running at far higher rotational speed than the usual axial contact seal. The sealing fluid does not come in contact with the gas to be sealed, with the exception of a very small percentage leaking toward the higher pressure side.

What I claim is:

1. In a machine of the class described and including a wall having a through opening and a rotatably mounted shaft extending through said opening: means providing a seal effective about said shaft at said opening, and including a sleeve closely fitting upon said shaft and having an annular head, and a ring disposed about said sleeve to bear endwise effectively between said wall and said head portion, the endwise bearing surfaces of the parts being spherical, said parts having passageways for directing lubricant to said shaft, intermediate the ends of said sleeve, by way of said ring and thence said sleeve, said passageways including a pair of equalizing passages annular with said ring at opposite bearing faces thereof, each being formed by an annular cavity in the ring and a cooperative annular cavity in the corresponding part having bearing therewith, and also including a longitudinal passageway in said ring interconnecting said annular passages.

2. Sealing means of the class described comprising an elongated sleeve adapted to have close fit upon a shaft to be sealed, and having an annular head, annular plate means disposed about said sleeve, and a ring disposed about the sleeve to bear endwise between said head and said plate, at least one pair of the endwise bearing surfaces being spherical, and an annular retainer cup secured to said plate means and having a portion extending therefrom and overhanging said ring to protect the bearing surfaces thereof, said retainer cup having a flange in overhanging relation with said sleeve head to maintain the parts in assembly as a unit.

3. Sealing means of the class described comprising an elongated sleeve adapted to have close fit upon a shaft to be sealed, and having an annular head, annular plate means disposed about said sleeve, and a ring disposed about the sleeve to bear endwise between said head and said plate, at least one pair of the endwise bearing surfaces being spherical, and an annular retainer cup secured to said plate means and having a portion extending therefrom and overhanging said ring to protect the bearing surfaces thereof, said retainer cup having a flange in overhanging relation with said sleeve head to maintain the parts in assembly as a unit, said retainer cup flange and said sleeve head having parts cooperative to maintain said endwise bearing at said ring.

4. Sealing means of the class described comprising an elongated sleeve adapted to have close fit upon a shaft to be sealed, and having an annular head, annular plate means disposed about said sleeve, and a ring disposed about the sleeve to bear endwise between said head and said plate, at least one pair of the endwise bearing surfaces being spherical, and an annular retainer cup secured to said plate means and having a portion extending therefrom and overhanging said ring to protect the bearing surfaces thereof, said retainer cup having a flange in overhanging relation with said sleeve head to maintain the parts in assembly as a unit, said retainer cup flange having resilience and being cooperative with a part of said sleeve head to yieldably maintain said endwise bearing at said ring.

5. In a machine of the class described and including a wall having a through opening and a rotatably mounted shaft extending through said opening: means providing a seal effective about said shaft at said opening, and including a sleeve closely fitting upon said shaft and having an annular head, a ring disposed about said sleeve to bear endwise effectively between said wall and said head portion, the endwise bearing surfaces of the parts being spherical, said parts having passageways for directing lubricant to said shaft, intermediate the ends of said sleeve, by way of said ring and thence said sleeve, said passageways including a pair of equalizing passages annular with said ring at opposite bearing faces thereof, each being formed by an annular cavity in the ring and a cooperative annular cavity in the corresponding part having bearing therewith, and also including a longitudinal passageway in said ring interconnecting said annular passages, and means preventing rotation of said sleeve and ring with said shaft while permitting them limited relative lateral motion, and comprising a pin longitudinally disposed in said ring with ends extending therebeyond through said annular cavities, said ends being sufficiently small to permit annular flow of said lubricant through said equalizing passages.

WILLIAM E. TRUMPLER.

REFERENCES CITED

The following references are of record in the file of this patent:

UNITED STATES PATENTS

| Number | Name | Date |
|---|---|---|
| 424,662 | Toucey | Apr. 1, 1890 |
| 849,576 | Schulz | Apr. 9, 1907 |
| 1,326,690 | Rice | Dec. 30, 1919 |
| 1,831,571 | MacArthur | Nov. 10, 1931 |
| 1,924,203 | Wintroath | Aug. 29, 1933 |
| 2,034,227 | Colwell et al. | Mar. 17, 1936 |

FOREIGN PATENTS

| Number | Country | Date |
|---|---|---|
| 204,097 | Great Britain | of 1923 |
| 297,614 | Italy | of 1932 |